Aug. 12, 1947.  D. JACKSON  2,425,679
ELECTRIC COUPLING
Filed Sept. 29, 1941

INVENTOR
D. JACKSON
BY Blair + Kilcoyne
ATTORNEYS

Patented Aug. 12, 1947

2,425,679

UNITED STATES PATENT OFFICE 2,425,679

ELECTRIC COUPLING

Donald Jackson, Cambridge, England, assignor to Pye Limited, Cambridge, England, a British company Application September 29, 1941, Serial No. 412,882
In Great Britain October 10, 1940

15 Claims. (Cl. 173—328)

This invention relates to electric plug and socket couplings.

An object of the invention is to provide a metal-clad plug and socket coupling which can be constructed mainly of pressings or stampings in order to eliminate or reduce the number of turned parts or castings which involve slow and manifold processes for their production and result in a heavy construction of coupling. Another object is to provide a metal-clad plug and socket coupling which is primarily adapted for construction substantially exclusively from pressings or stampings but which permits corresponding turned parts or castings to be incorporated in substitution for pressed or stamped components, when desired.

In one form of the invention a metal-clad plug and socket coupling is provided in which the casings of the plug and socket are made of metal stampings and/or pressings. If either of the casings comprises two or more component parts these may be assembled without screwing. Preferably the contact members of the plug and socket are also made of metal stampings or pressings and are mounted on stamped-out insulating plates. The preferred coupling according to the invention is made entirely or substantially entirely of stamped or pressed components and all components of the plug and socket that have to be assembled are assembled entirely or substantially entirely without screwing.

The use of stamped or pressed components designed for assembly by screwless means has the advantages that couplings constructed thereof may be produced easily, cheaply and rapidly on account of the high rate of production afforded by stamping and pressing processes which additionally enable the components to be made of light-gauge material thus resulting in couplings which are light in weight without requiring the use of light metals. Moreover, the components need not be very accurately made.

One construction of plug and socket coupling embodying the invention will now be described, by way of example, with reference to the accompanying drawings. The coupling shown is a six-way coupling which is particularly intended for use on aircraft for connecting cables to the radio equipment thereof, but is, of course, applicable for other purposes.

Figure 1:
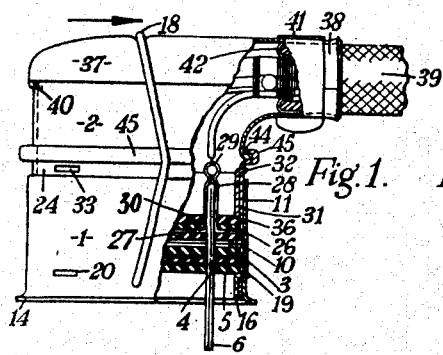
Fig. 1 shows a side view, partly in section, of a plug and socket coupling according to this invention.
Figure 3:
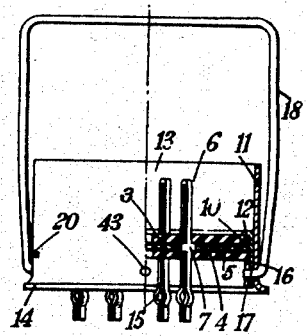
Fig. 3 shows a half elevation-half section of the plug looking in the direction of the arrow in Fig. 1.
Figure 2:
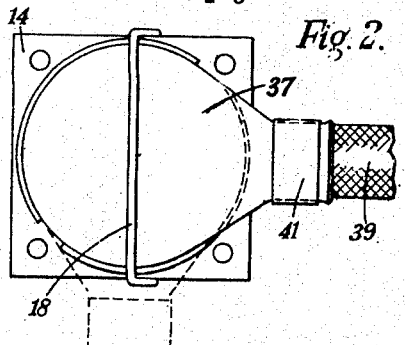
Fig. 2 shows a plan view of Fig. 1.
Figure 4:
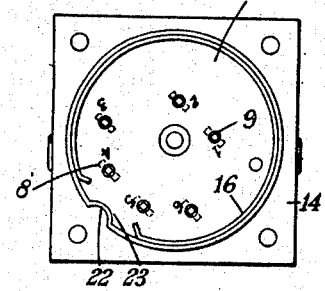
Fig. 4 is a view of the plug shown in Fig. 3 looking from below.
Figure 5:
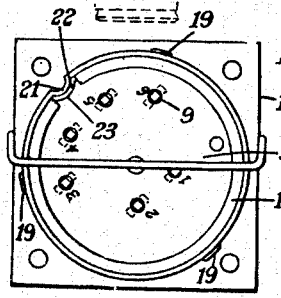
Fig. 5 is a view of the plug shown in Fig. 3 looking from above.

The plug and socket coupling shown in the drawings has a plug 1 intended to be mounted on a panel or the like and a socket 2 intended to be fitted on to the end of a cable. The plug 1 has a contact member assembly which comprises three superposed stamped-out discs 3, 4 and 5 of insulating material of the insulating board type through which contact pins 6 project in both directions. These pins are each made of a short length of metal strip doubled back on itself to form a rectangular-shaped split pin, the two halves of the strip having each at the same point between their ends small integral projections 7 extending laterally at opposite sides of the strip. Such a split pin is formed from a suitable cross-like metal blank. The middle disc 4 of the three discs mentioned is provided with rectangular or other appropriately shaped apertures 8 to accommodate the lateral projections 7 of the pins and the two outer discs have apertures 9, which may conveniently be made circular, which permit the pins but not the lateral projections to pass therethrough. After assembly of the contact pins and plates the latter are preferably given a coating of a sealing varnish, wax or the like.

The plug 1 has a pressed-metal body which comprises two nested annular members, the inner member 10 being inwardly turned at one end to form a shoulder 12, the outer member 11 extending beyond the shouldered end of the inner member so as to provide a recess 13 for receiving the socket 2 of the coupling. The opposite end of the outer member has an outwardly turned flange 14 for mounting the plug on a panel or the like.

The contact pin assembly is placed in the plug body so that the disc 3 seats on one side against the shoulder 12 of the inner member 10 with the split or closed ends (as desired) of the pins 6 projecting into the recess 13 provided by the outer member. The other ends of the pins 6 which lie in the opposite direction serve as tags for soldering wires thereto. These other ends of the pins may be shaped to provide loops 15 into which the wires may be inserted. The assembly is held in place against the shoulder 12 by a retaining ring 16 formed from a piece of metal strip bent into an annulus, which is placed inside the inner member 10 against the disc 5 of the contact pin assembly. The outer member 11, the inner member 10, and the retaining ring 16 are secured together by the ends 17 of a wire stirrup clip 18 which pass respectively through registering holes in the members and ring. The stirrup clip 18 is provided to clip on to the socket 2 as shown in Fig. 1 when the socket is fitted to the plug 1, so as to keep the two parts of the coupling together. The outer and inner members and the retaining ring may be alternatively or additionally secured together by outwardly projecting lugs 19 on the retaining ring 16 which enter slots 20 in the inner and outer members. In order to prevent relative rotation of the inner and outer members and the contact pin assembly, the outer member is formed with an inward depression 21 which extends axially thereof and acts as a key which engages in a corresponding depression 22 in the inner member 10, which, in turn, engages in a notch 23 cut in the edges of the discs 3, 4 and 5 forming the contact pin assembly.

The socket 2 of the coupling has a hollow pressed metal body 24 which terminates at one end in an inturned shoulder 25 similar to the shoulder 12 on the inner member 10 of the plug body. Against this shoulder 25 similarly seats the contact member assembly of the socket. The assembly in this case comprises two superposed stamped-out insulating discs 26, 27 with aligned apertures and contact sockets 28 each formed from a short length of metal strip doubled back on itself and stepped at a point away from the doubled end so as to form a socket. The doubled end serves as a tag for soldering a wire thereto and may be shaped to provide a loop 29 in which to put the wire. The free ends of the strip are bent outwardly to provide lateral projections 30 which are located between the two discs 26 and 27. The discs when assembled with the contact sockets may be treated with a sealing varnish or wax and the assembly is held in position against the shoulder 25 of the socket body by a retaining ring 31, in a manner similar to that previously described. The ring is secured to the socket body by lugs 32 on the ring entering slots 33 in the body 24. An additional disc 36 may be provided adjacent the disc 26 in order to give more support to the contact sockets 28.

The body 24 is formed with an axially extending depression or keyway 34 which is adapted to engage within the depression 21 in the outer member 11 of the plug in order to ensure that the socket is fitted to the plug in the correct position. The depression 34 also prevents rotation of the contact member assembly by engaging in a notch 35 formed in the edges of the discs 26 and 27 of this assembly.

Figure 6:
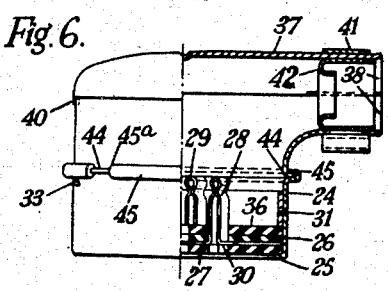
Fig. 6 is a half section-half elevation of the socket looking in the direction of the arrow in Fig. 1 but with the upper cable holding portion turned through an angle of 90°.
Figures 7, 8:
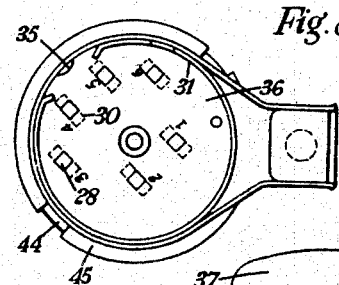
Fig. 7 is a view of the socket shown in Fig. 6 looking from below.
Fig. 8 is a view of the socket shown in Fig. 6 looking from above and with the cover removed.
Figure 9:
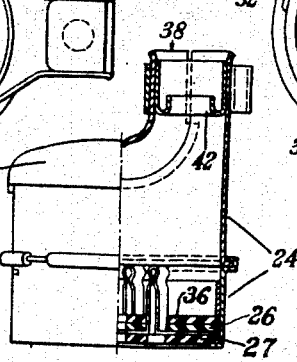
Fig. 9 shows an alternative form of socket.

To facilitate connection and disconnection of a cable from the socket, the socket body has a removable cover part 37 which forms with the body 24 two halves of a neck 38 which receives the end of the cable 39. The cover is secured on the socket body by screwless means and preferably by a lug 40 on the cover engaging a slot in the socket body 24 and by a spring clip 41 holding the halves of the neck together. This clip is ring-shaped such that it can be sprung over and embrace both halves of the neck 38. Within the neck 38 is arranged a collar 42 which is adapted to grip the cable sheath. The socket body may be constructed so that the neck extends axially of the socket (Fig. 9) or at an angle, e. g. at right angles (Figs. 1 and 6), according to requirements.

The socket body 24 may be divided transversely as shown in the drawings so that the part thereof which carries the cable end is rotatable with respect to the part housing the socket contacts. When the neck 38 is at an angle to the axis of the socket, such rotatability affords a choice of radial directions in which to lead the cable. With a fixed anchorage on the plug body for the ends of the stirrup clip 18 that clips onto the socket the choice of directions is limited to two, but by providing another pair of apertures 43 in the inner and outer members of the plug body in which the ends 17 of the clip 18 may be inserted, it becomes possible to select any one of four possible directions. Preferably, provision is made for locking or otherwise maintaining the aforesaid two parts of the socket body in adjusted relative position. In the arrangement shown, these parts are connected by an out-turned flange 44 on the edge of one part which lies in a channel formed by a bead 45 on the edge of the other part, so that the two parts are relatively rotatable. The bead 45 is discontinuous so as to provide therein one or more slots 45a at which the flange 44 is exposed and protrudes. When the two parts have been adjusted to a desired relative position, they can then be locked in that position by bending or otherwise deforming the flange 44 where it protrudes through the slot or slots 45a.

The described coupling is particularly suitable for screened cables as the contacting metallic bodies of the plug and socket afford continuity of screening with the metal sheath of such cables.

Further, although the invention has been described with reference to a complete plug and socket coupling, it is to be understood that the invention also embraces the individual features herein described.

I claim:

1. For an electric coupling, a socket comprising an annular member which is formed as a stamping or pressing and has an inwardly directed shoulder at one end thereof, a disc of insulating material adapted to fit within said member and abut against its shoulder and having at least one aperture therein, a second disc of insulating material also adapted to fit within said member and lie adjacent said first disc and having apertures therein corresponding in position to the apertures in the first disc, a contact socket having outwardly extending portions adjacent its open end, which contact socket is adapted to pass through the aperture in said second disc and have its outwardly extending portions between said discs to hold the contact socket in position, and a retaining ring adapted to fit within said annular member and having outwardly turned lugs adapted to engage in apertures in said member to hold the insulating disc in position between said retaining ring and the shoulder.

2. For an electric coupling, a plug comprising an outer annular member made of a metal stamping or pressing, an inner annular member adapted to fit within said outer annular member, said inner member also being formed as a stamping or pressing and having an inwardly directed shoulder at one end thereof, a disc of insulating material adapted to fit within said member and abut against its shoulder and having at least one aperture therein, a second disc of insulating material also adapted to fit within said inner member and lie adjacent said first disc and having apertures therein corresponding in position to the apertures in the first disc, a contact pin having an enlarged central portion the ends of which extend through correspondingly positioned apertures in the said two discs with the enlarged portion between said discs so as to hold said contact pin in position, a retaining ring adapted to fit within said inner member, and means for holding said inner and outer members and the retaining ring in fixed positions relative to one another with the retaining ring holding the insulating discs in position between said retaining ring and the shoulder.

3. A plug as claimed in claim 2, wherein said retaining ring has outwardly turned lugs adapted to engage in apertures in said inner and outer members to hold them in a fixed position relative to one another with the retaining ring holding the insulating discs against the shoulder.

4. In an electric coupling, the combination of an annular housing having an inwardly directed shoulder, a contact assembly comprising a disc of insulating material carrying contact members, said insulating disc being adapted to fit within said annular member and abut against its shoulder, and a spring retaining ring fitting within said annular member and abutting against said disc to hold said contact assembly in engagement with said shoulder, and means forming a key between the disc and housing to hold the contact assembly and housing against mutual relative rotation.

5. In an electric coupling, the combination of an annular housing having an inwardly directed shoulder, a contact assembly comprising a disc of insulating material carrying contact members, said insulating disc being adapted to fit within said annular member and abut against its shoulder, a spring retaining ring fitting within said annular member, and outwardly turned lugs on said retaining ring adapted to engage in apertures in said annular member to hold the retaining ring against longitudinal movement and in a position in which the contact assembly is held in engagement with the shoulder.

6. For an electric coupling, a socket comprising an annular member which is formed as a stamping or pressing and has an inwardly directed shoulder at one end thereof, a contact socket assembly comprising a disc of insulating material carrying at least one socket, said contact socket assembly being adapted to fit within the annular member with the disc abutting against the shoulder thereof, a resilient retaining ring adapted to fit within said annular member and abutting against the disc to hold the contact socket assembly in position between said retaining ring and said shoulder, and means providing a key between the disc and annular member to hold the contact assembly and annular member against mutual relative rotation.

7. For an electric coupling, a plug comprising an outer annular member made of a metal stamping or pressing, an inner annular member adapted to fit within said outer annular member, said inner member also being formed as a stamping or pressing and having an inwardly directed shoulder at one end thereof, a contact assembly comprising a disc of insulating material carrying at least one contact pin projecting from the surface thereof, said insulating disc being adapted to fit within said inner annular member and abut against its shoulder, a resilient retaining ring adapted to fit within said inner member, and means for holding said inner and outer members and the retaining ring in fixed positions relative to one another with the retaining ring holding the contact assembly in position between said retaining ring and the shoulder.

8. For an electric coupling, a plug as claimed in claim 7 wherein the outer tubular member is provided with a flange.

9. For an electric coupling, a plug as claimed in claim 2, wherein the enlarged central portion of the contact pin is of rectangular form, and wherein a third disc of insulating material is positioned between the two discs of insulating material and is provided with a corresponding rectangular shaped aperture in which the enlarged central portion of the contact pin fits to prevent the pin from turning.

10. An electric coupling element comprising a pair of annular members fitting telescopically one within the other and each having a portion of its annular wall similarly deformed to form axially extending key-ways comprising a groove on one side and a ridge on the opposite side of each member, the groove of one of said pair of members engaging the ridge of the other of said members so as to hold the two members against mutual relative rotation, means holding said members against mutual relative axial displacement, the inner member having an inwardly directed shoulder at one end thereof, a contact assembly comprising a disc of insulating material carrying at least one contact member and fitting within the inner annular member with the disc abutting against the said shoulder thereof, means retaining said disc against axial displacement away from said shoulder, said disc having at a portion of its periphery a formation complementary to and in engagement with the inwardly facing formation of the deformed portion of the inner annular member, whereby to fix said disc against rotation relatively to the inner and outer annular members, the outer annular member and its axial deformed portion extending axially beyond the shouldered end of the inner member, the extended deformed portion being adapted to receive a mating coupling element in an unique positional relation.

11. A coupling element as defined in claim 10, one of said annular members having a mounting flange at the opposite end thereof from the shouldered end of the inner of said members.

12. In an electric coupling, an insulating contact-carrying member, a metallic housing formed of complementary sections including a pair of inseparable but relatively rotatable coaxial annular sections one of which houses said insulating member and the other of which has an offset tubular neck for a cable entry, means comprising an annular bead on one of said annular sections embracing an annular flange on the other of said sections for inseparably securing said sections together while affording relative rotation therebetween, said bead having at least one gap therein through which a portion of said flange is exposed and is adapted to be deformed for non-releasably locking said sections together after they have been adjusted to a desired relative position.

13. In the combination of a multi-pole electric plug and socket coupling elements, each coupling element comprising a tubular member in telescopic engagement with the other when in coupled position and each having longitudinally keying means formed by cooperating grooves in each of the tubular members extending at least part way along the tubular members and open at the end thereof which is directed towards the other part of the coupling when the two parts are in coupled relationship, the formation of the groove in each of the tubular members simultaneously forming a ridge on the opposite surface of the member, and wherein in each tubular member a contact assembly comprising a disc of insulating material carrying contact members fits within said tubular member and is located in a predetermined position relative thereto by engaging with the inwardly facing surface of the formed groove, whereby when the plug and socket elements are in assembled condition the keying means operates to maintain the contact assembly discs in the corresponding definite relative positions in the coupling elements and also defines a single predetermined definite coupling position of the coupling elements.

14. The combination of multi-pole electric pug and socket coupling elements, each coupling element comprising a tubular housing in telescopic engagement with the other when in coupled position, and each housing having a longitudinal groove extending inwards from its open end and slidably engaging with the like groove in the other housing to form complementary keying means, said housings each having an inwardly directed shoulder, a contact mount carrying contact members fitting within each housing and abutting against said shoulder, retaining means holding each said mount against its shoulder, respectively, and complementary keying means formed in each mount and interengaging with said housing keying means to hold said respective housings and mounts against relative rotation with respect to each other, whereby said keying means maintains the contact assembly of each coupling element in a definite relative angular position therein and also defines a single predetermined angular coupling position of said coupling elements.

15. The combination of electric plug and socket coupling elements having telescoping engagement one within the other, each element comprising an annular housing having an inwardly directed shoulder in engagement with the corresponding shoulder of the other and each element having an annular wall distorted at least part way axially therealong to produce an axial groove in one annular surface and a complementary ridge on the other annular surface thereof, said ridge of one element engaging the groove of the other element, a contact assembly within each element comprising a disc of insulating material carrying contact members and fitting within said annular housing with said disc abutting against the shoulder thereof, each said disc having a portion of its periphery shaped to engage a distorted portion of the adjacent wall, and means for retaining said contact assemblies respectively in said housings, said plug and socket elements being separable axially with their contact assemblies, respectively, and replaceable in the same coupling relation with like telescoping coupling elements.

DONALD JACKSON.

REFERENCES CITED

The following references are of record in the file of this patent:

UNITED STATES PATENTS

| Number | Name | Date |
|---|---|---|
| 2,231,124 | Joseph | Feb. 11, 1941 |
| 2,253,015 | Centrella | Aug. 19, 1941 |
| 2,173,323 | Roby | Sept. 19, 1939 |
| 1,933,272 | Leubelink | Oct. 31, 1933 |
| 1,755,166 | Cannon | Apr. 22, 1930 |
| 1,103,244 | Anderson | July 14, 1914 |
| 2,149,027 | Meredith | Feb. 28, 1939 |
| 1,956,409 | Benander | Apr. 24, 1934 |
| 2,077,801 | Ludwig | Apr. 20, 1937 |
| 764,829 | Scott | July 12, 1904 |
| 1,754,312 | Garratt | Apr. 15, 1930 |
| 2,049,919 | McCain | Aug. 4, 1936 |
| 2,169,961 | Del Camp | Aug. 15, 1939 |
| 2,286,952 | Cannon | June 16, 1942 |
| 2,235,207 | Eby | Mar. 18, 1941 |
| 2,196,254 | Draving | Apr. 9, 1940 |
| 2,174,383 | Folsom | Sept. 26, 1939 |
| 1,806,548 | Rabezzana | May 19, 1931 |

FOREIGN PATENTS

| Number | Country | Date |
|---|---|---|
| 368,713 | Great Britain | Mar. 8, 1932 |